United States Patent [19]

Wu

[11] Patent Number: 4,726,600
[45] Date of Patent: Feb. 23, 1988

[54] DUAL SYSTEM BICYCLE

[76] Inventor: Ying-Hao Wu, No. 22-1, Lane 170, Pei-Hua Street, Tainan City, Taiwan

[21] Appl. No.: 891,221

[22] Filed: Jul. 29, 1986

[51] Int. Cl.$^4$ .................. B62M 1/12; F16H 21/18
[52] U.S. Cl. ................................. 280/234; 74/42; 280/257
[58] Field of Search ............ 280/230, 233, 234, 240, 280/247, 252, 256, 257, 259; 74/42, 43, 51

[56] References Cited

U.S. PATENT DOCUMENTS

| | | | |
|---|---|---|---|
| 614,146 | 11/1898 | Vonhausen | 280/234 |
| 3,921,464 | 11/1975 | Greseth | 280/234 |

FOREIGN PATENT DOCUMENTS

| | | | |
|---|---|---|---|
| 80445 | 4/1895 | Fed. Rep. of Germany | 280/234 |

*Primary Examiner*—John J. Love
*Assistant Examiner*—Mitchell J. Hill
*Attorney, Agent, or Firm*—Christie, Parker & Hale

[57] ABSTRACT

A dual system bicycle for hand and foot propelling operations including a handle device with a front link mechanism operatively installed on top of a front fork member fixed on a front wheel of a bicycle, and a lever device with a rear link mechanism movably connected between the front link and a pedal system installed in a lower portion of a frame structure and in the rear wheel through a chain wheel arrangement of the bicycle; thereby, the rider can use both hands and feet for propelling the bicycle, improving his bodily fitness and increasing the moving speed of the bicycle. Alternatively, the dual system bicycle can be easily changed into an ordinary bicycle mode for foot propulsion only.

4 Claims, 13 Drawing Figures

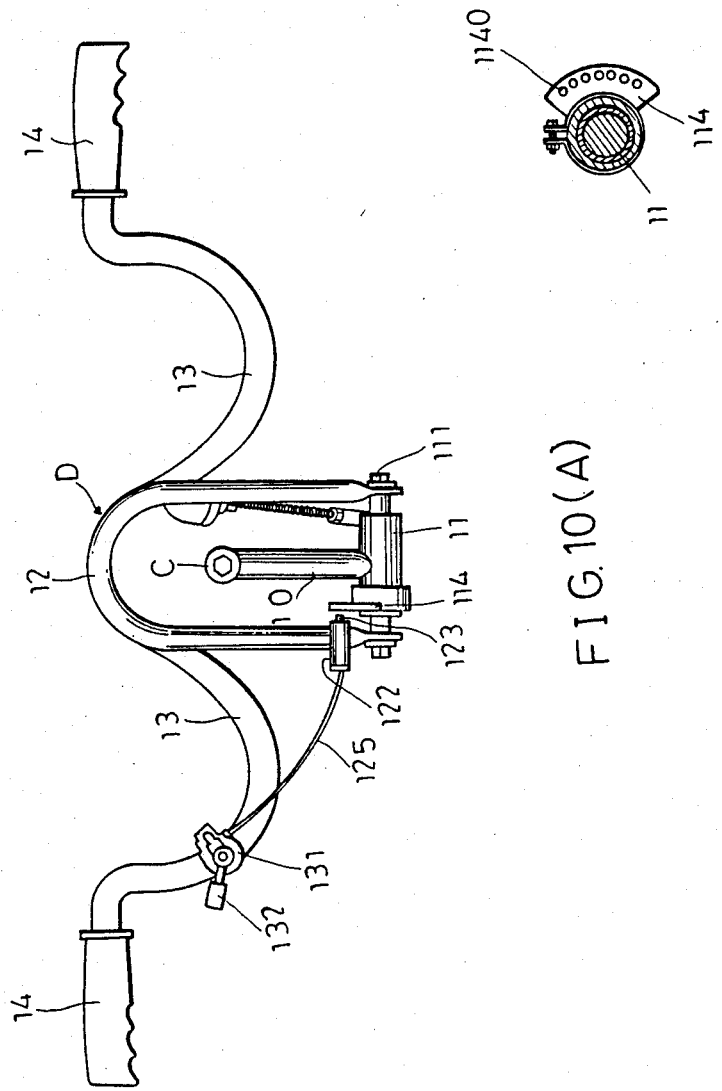

DUAL SYSTEM BICYCLE

BACKGROUND OF THE INVENTION

This invention relates to a bicycle, and more particularly to a dual system bicycle, which is designed to be propelled by a rider's hands and feet for promoting the rider's bodily exercise and increasing the moving speed of the bicycle.

Bicycles have been widely used as important equipment for travel, sports and recreations the world over. However, the structure of the known bicycles are all similar, and particularly no technical breakthrough has been achieved in the method of propelling a conventional bicycle. As shown in FIG. 1, a known bicycle is generally composed of a front wheel A and a rear wheel B; the front wheel A is provided with a fork member C and a handle bar D, which is connected to a frame structure E and a saddle F; under the frame structure E a chain wheel G is coupled with a pedal structure H and a chain I, which is movably engaged with a rear sprocket wheel J for driving the rear wheel B. Usually, when a rider seats himself on the saddle F, he places his hands on the handle bar D for supporting his upper body and steering the bicycle while putting his two feet on the pedal structure H for propelling the rear wheel B to move the bicycle forward. As is known in bicycle riding, all the moving power comes from the rider's two feet, which provide the most momentum in bicycle riding. Therefore, during long-distance travel by bicycle, the rider is easily tired because of the fatigue of his feet.

SUMMARY OF THE INVENTION

It is accordingly a primary object of this invention to provide a bicycle with a dual propelling system, by which all parts of a rider's body receive a workout in riding the bicycle so as to increase the moving speed of the bicycle and effect complete bodily fitness.

This and other objects are achieved by providing a dual system bicycle which includes, in general, as the known bicycle shown in FIG. 1, a front wheel and a rear wheel, a front fork member connected to the front wheel, a frame structure having a saddle arranged in a central area thereof connected between the front fork member, a pair of pedal members and a chain wheel rotatably disposed at a lower portion of the frame structure, and a small sprocket wheel fixed at a center portion of the rear wheel with a chain movably engaged around the small sprocket wheel and the chain wheel. This invention comprises a novel handle device with a front link mechanism operatively installed on top of the front fork member, and a lever device with a rear link mechanism movably connected between the front link mechanism and pedal members; thereby, both hands and feet are used simultaneously in propelling the bicycle.

This invention resides specifically in a feature of the handle device, which is designed to be movably operated up and down by a rider's hands, and the lever device movably connected between the front link mechanism of the handle device and the pedal mechanism of the bicycle of producing leverage effect along with the rider's pedalling operation; so that both the pedal members and hand grips of the bicycle are cooperatively operated to propel the bicycle during riding.

This invention resides in another feature of the structure between the handle device and the lever device wherein the former can be locked in position and disengaged with the latter so that the mode of the bicycle can be changed into an ordinary type for foot propelling operation only.

Further characteristics and advantages of this invention will become more apparent from the following detailed description of one example of a preferred but not a sole form of embodiment, given below with reference to the accompanying drawings.

BRIEF DESCRIPTION OF THE DRAWINGS

FIG. 10 (A, B) is a top view of the handle device and a partially sectional illustration of an anchoring member of the preferred embodiment shown in FIG. 2.

DETAILED DESCRIPTION OF THE PREFERRED EMBODIMENT

Figure 1:
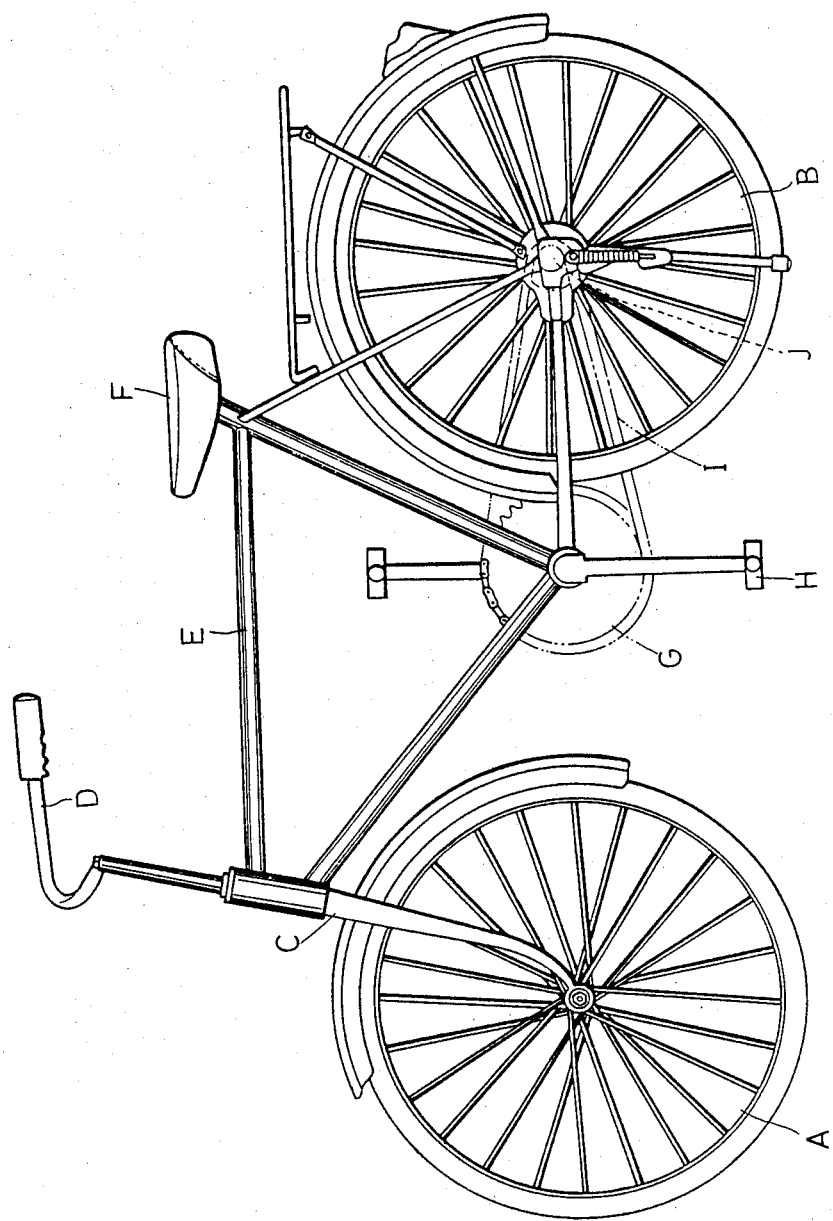
FIG. 1 is a structural illustration of a known bicycle.
Figure 2:
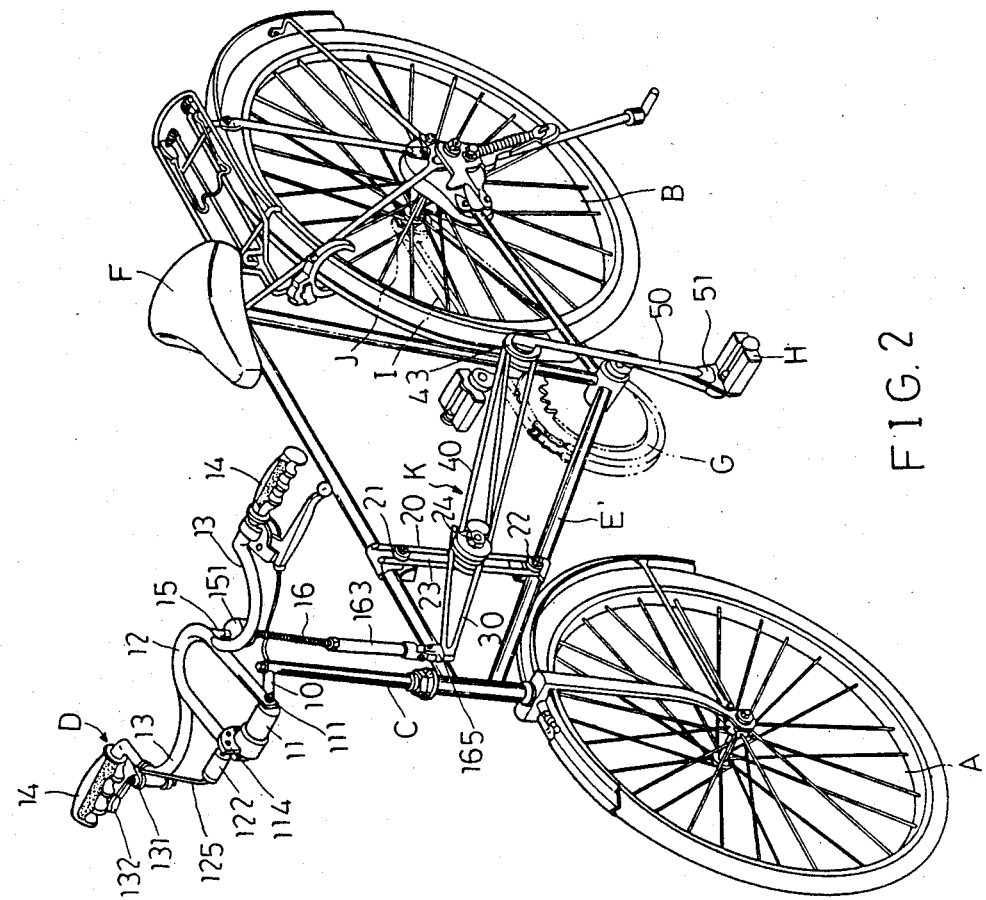
FIG. 2 is a perspective view of a preferred embodiment of a dual system bicycle according to this invention.

Referring to FIG. 2, there is shown a preferred embodiment of a dual system bicycle according to this invention, wherein the structure of the bicycle includes in combination a front wheel A, a rear wheel B, a front fork member C, a bicycle frame structure E, a saddle F, a pair of pedal members H, a chain wheel G, a chain I and a small sprocket wheel J. Since the structure and installation of these elements are of prior art, detailed description is omitted for clarity. The preferred embodiment of this invention comprises a handle device D and a lever device K cooperatively installed in the bicycle for effecting dual propelling operations.

Figure 3:
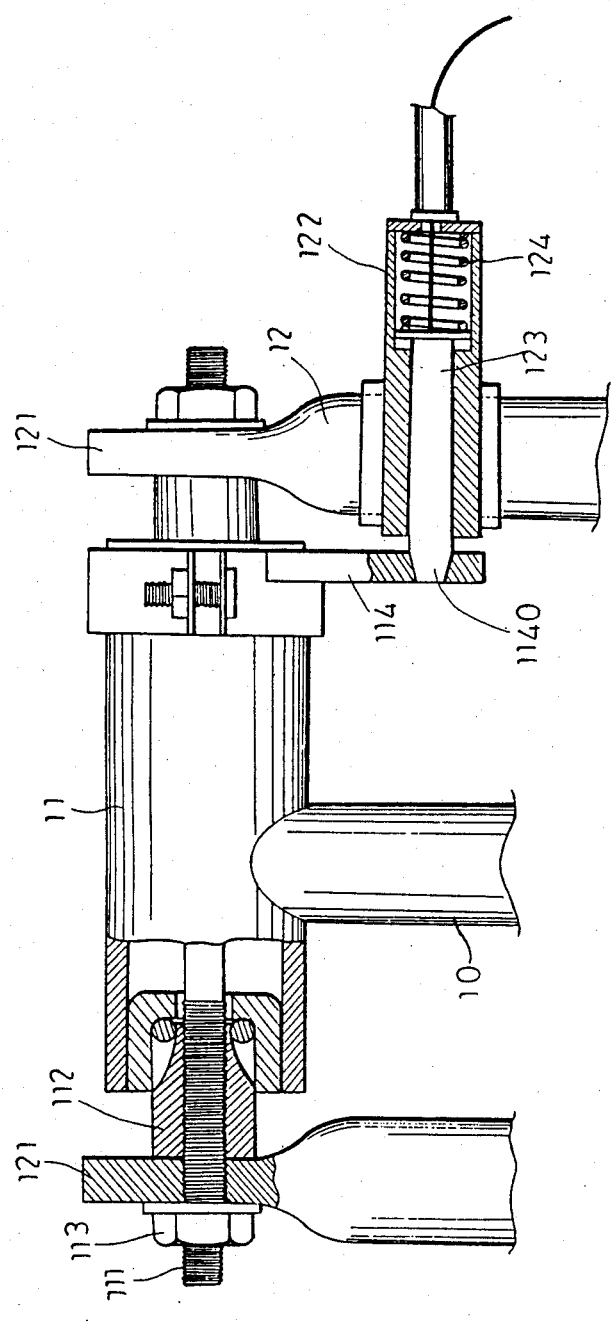
FIG. 3 is a partial sectional view of a handle device of the preferred embodiment shown in FIG. 2.

Referring to FIGS. 2 and 3, the handle device D includes: a supporting arm 10 with one end horizontally fixed at a top end of the front fork member C; a transverse axle sleeve 11 horizontally connected to another end of the arm 10; a U-shaped member 12 formed at a center curved portion of the handle device D with two ends 121 thereof, as shown in FIG. 2, horizontally connected to opposing sides of the transverse axle sleeve 11; and a pair of hand grips 14, each haveing an arched portion 13 symmetrically formed at opposing sides of the U-shaped member 12, respectively provided at both ends of the handle device.

Referring to FIG. 3, the transverse axle sleeve 11 is a hollow pipe structure and includes a pair of bearings 112 separately installed at the opposing ends thereof, a pivot axle 111 coaxially disposed in the hollow section of the transverse axle sleeve 11 with two ends of the pivot axle 111 respectively fixed by a nut 113 at two opposing ends 121 of the U-shaped member 12 through the bearings 112, and an anchoring member 114 having a plurality of orifices 1140 formed therein vertically fixed at one side of the transverse axle sleeve 11. It shall be appreciated that the longitudinal length of the U-shaped member 12 is longer than the supporting arm 10 so that, when a rider's hands hold the two hand grips 14, the handle device D can be conveniently moved up and down along the pivot axle 111.

As shown in FIGS. 2 and 3, a cotter tube 122 is provided at one side of the U-shaped member 12 and located in conjunction with the locations of the orifices 1140 of the anchoring member 114, and a cotter 123 matched with a spring 124 are movably installed in the cotter tube 122 with a front end of the cotter 123 able to be inserted into any one of the orifices 1140 of the anchoring member 14 so as to prevent the hand grips 14 from being moved therefrom. A steel guide wire 125 is connected at a rear end of the cotter 123 and extends to be fixed at a control member 131, which is disposed at a proper place on the arched portion 13 adjacent to the hand grip 14 and connected to a locating and throw member 132. When the pull and throw member 132 is operated to pull the steel guide wire 125 backward, the cotter 123 will be disengaged from the orifice 1140 of the anchoring member 114 so as to enable the handbar arrangement D to be moved up and down therefrom.

Figure 4:
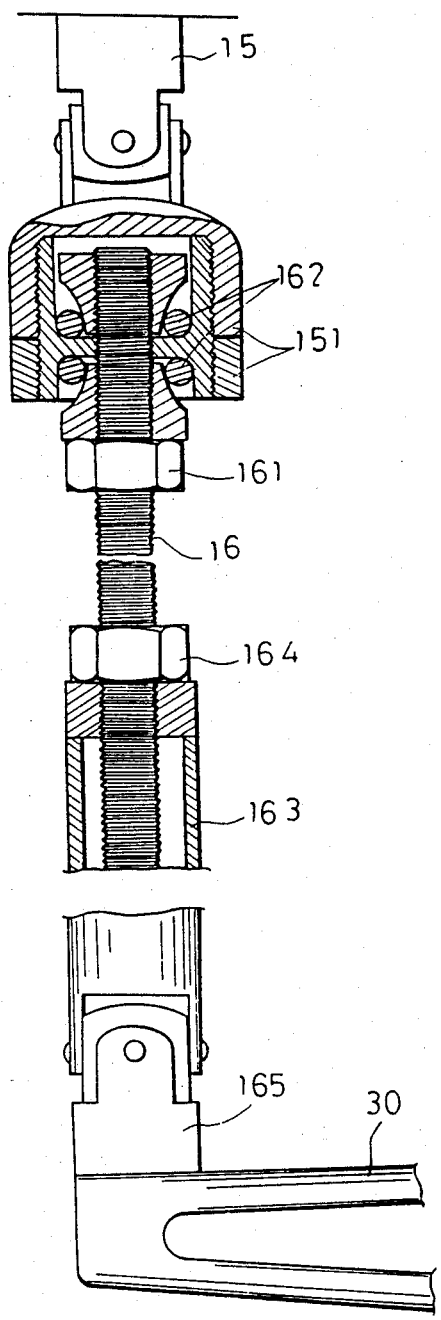
FIG. 4 is a partial sectional view of a front part of a lever device of the preferred embodiment shown in FIG. 2.

Referring to FIGS. 2 and 4, a first univeral joint 15 is provided under a bottom side of a base of the U-shaped member 12, and a set of screw sleeves 151 is movably connected to the first universal joint 15 at a top portion. A set of bearings 162 are installed in the screw sleeves 151 and positioned therein by a nut 161 so as to enable the screw sleeves 151, which are screw-connected to a top end of a front link 16 at a lower end, to perform free rotation at the top end of the front link 16. The front link 16 is substantially a threaded rod with a lower portion adjustably connected to a sleeve pipe 163 by which the length of the front link 16 can be optionally adjusted and then secured by a nut 164. A second universal joint 165 is connected to a bottom end of the sleeve pipe 163 for being coupled with a lever device K.

Figure 5A:
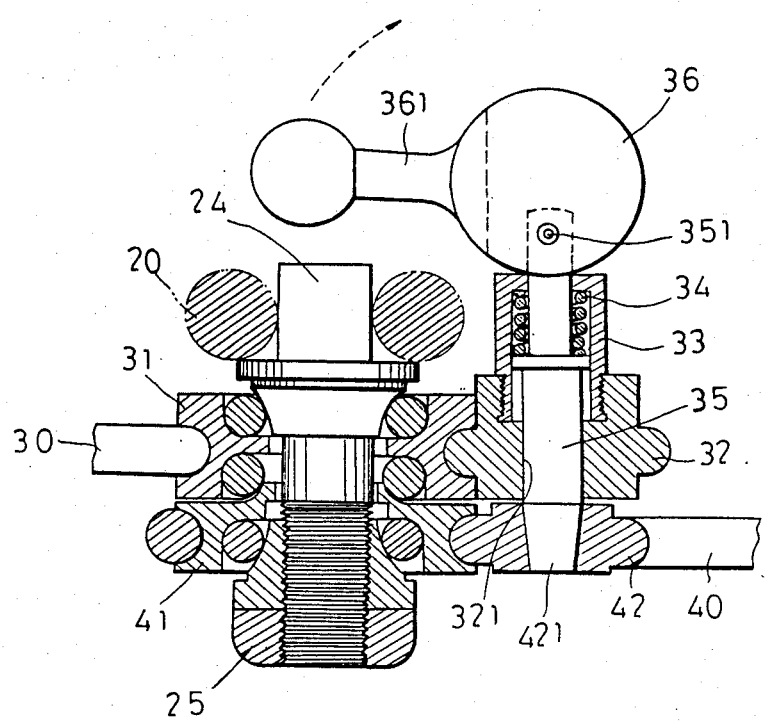
FIG. 5 (A, B) is a sectional and illustrative view of the lever device of the preferred embodiment shown in FIG. 2.
Figure 5B:
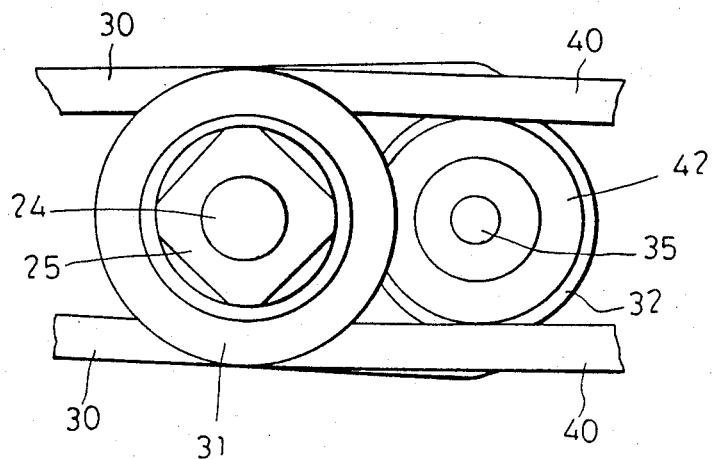

As shown in FIGS. 2 and 5 (A, B), the lever device K includes: a fixed rod member 20 having a central slot 23 formed therein, vertically installed at a proper place between a cross bar E and a front down tube E' (the rod member 20 is fixed at a slightly inclined vertical condition thereat) through a pair of fasteners 21 and 22; a supporting axle 24 horizontally fixed at a proper place in the central slot 23 of the fixed rod member 20 through a pair of bearing blocks 31 and 41 superposedly installed in the central slot 23 with a nut 25 securing them in position at an end of the bearing blocks 31 and 41, as shown in FIG. 5 (A, B); a cotter block 32 with a central opening 321 and a cotter block 42 with a central opening 421 superposedly fixed at a rear end of the bearing blocks 31 and 41; a front lever 30 and a rear lever 40 reversely disposed at the periphery of the bearing blocks 31 and 41 wherein a front end of the front lever 30 is movably connected to the second universal joint 165 at a bottom end of the front link 16 and the rear end of the front lever 30 is respectively coupled with the bearing block 31 and the cotter block 32. A front end of the rear lever 40 is connected to the the cotter sleeve 42, as shown in FIG. 5A, and the rear end of the rear lever 40 is fixed at a bearing block 43 (as shown in FIG. 6). The cotter block 32 includes a hollow sleeve 33 screw-connected to a threaded opening of the cotter block 32 around a top portion of the central opening 321, a cotter 35 matched with a spring 34 at a top portion thereof movably disposed in the hollow sleeve 33 with at top end of the cotter 35 extending through the hollow sleeve 33 and movably connected to an eccentric wheel 36 through a pin 351. A lower end of the cotter 35 is movably located in the openings 321 and 421 so as to link the front lever 30 and the rear lever 40 together therewith for effecting swinging operation along a fulcrum provided by the supporting axle 24. The eccentric wheel 36 having a hand grip 361 integrally formed thereon is disposed on top of the hollow sleeve 33 so that by operating the hand grip 361, the cotter stem 35 will be disengaged with the opening 421 so as to make the rear lever 40 out of linked-up action with the front lever 30.

Figure 6A:
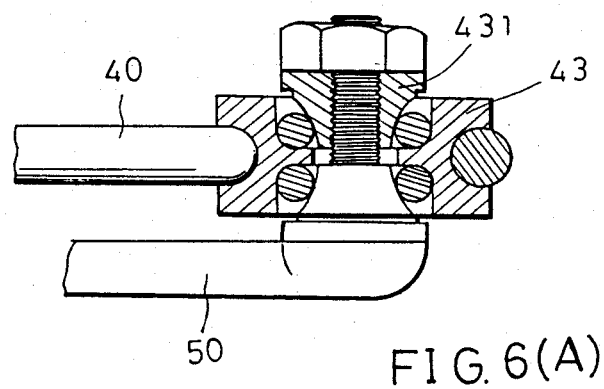
FIG. 6 (A, B) is a partial sectional and illustrative view of a rear part of the lever device of the preferred embodiment shown in FIG. 2.
Figure 6B:
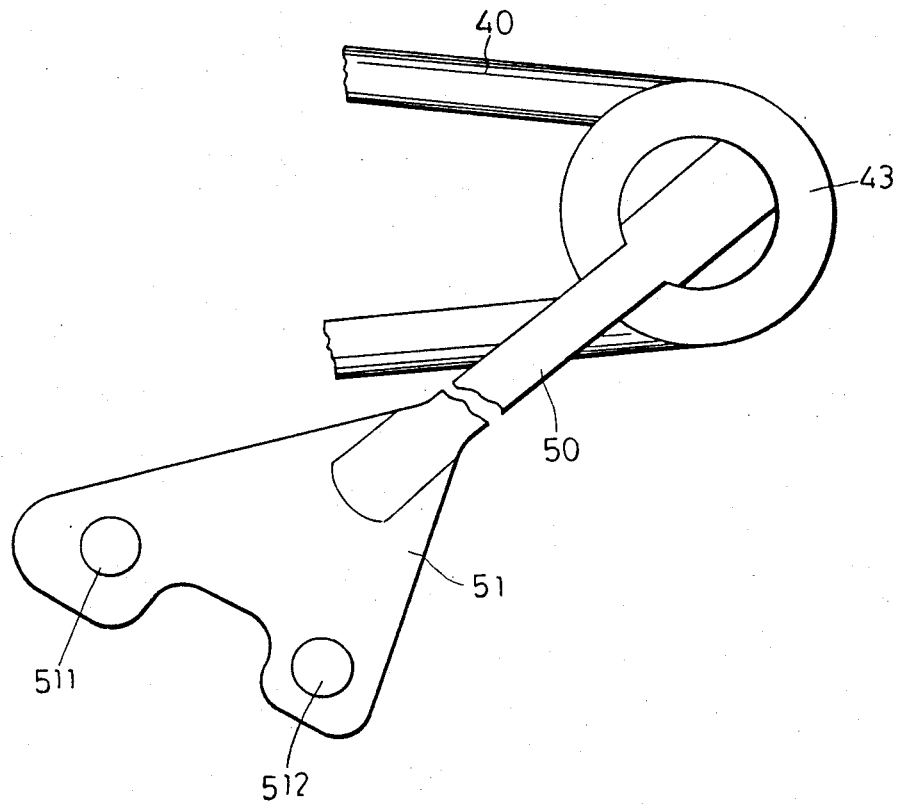

As shown in FIG. 6A and 6B, the bearing block 43 includes a central pivoted axle 431 with a lower end thereof connected to a rear link 50 of which a distal end is fixed at an anchoring member 51 for being connected to the pedal member H through a plurality of screws secured in a plurality of screw holes 511 and 512 of the anchoring member 51.

Figure 7:
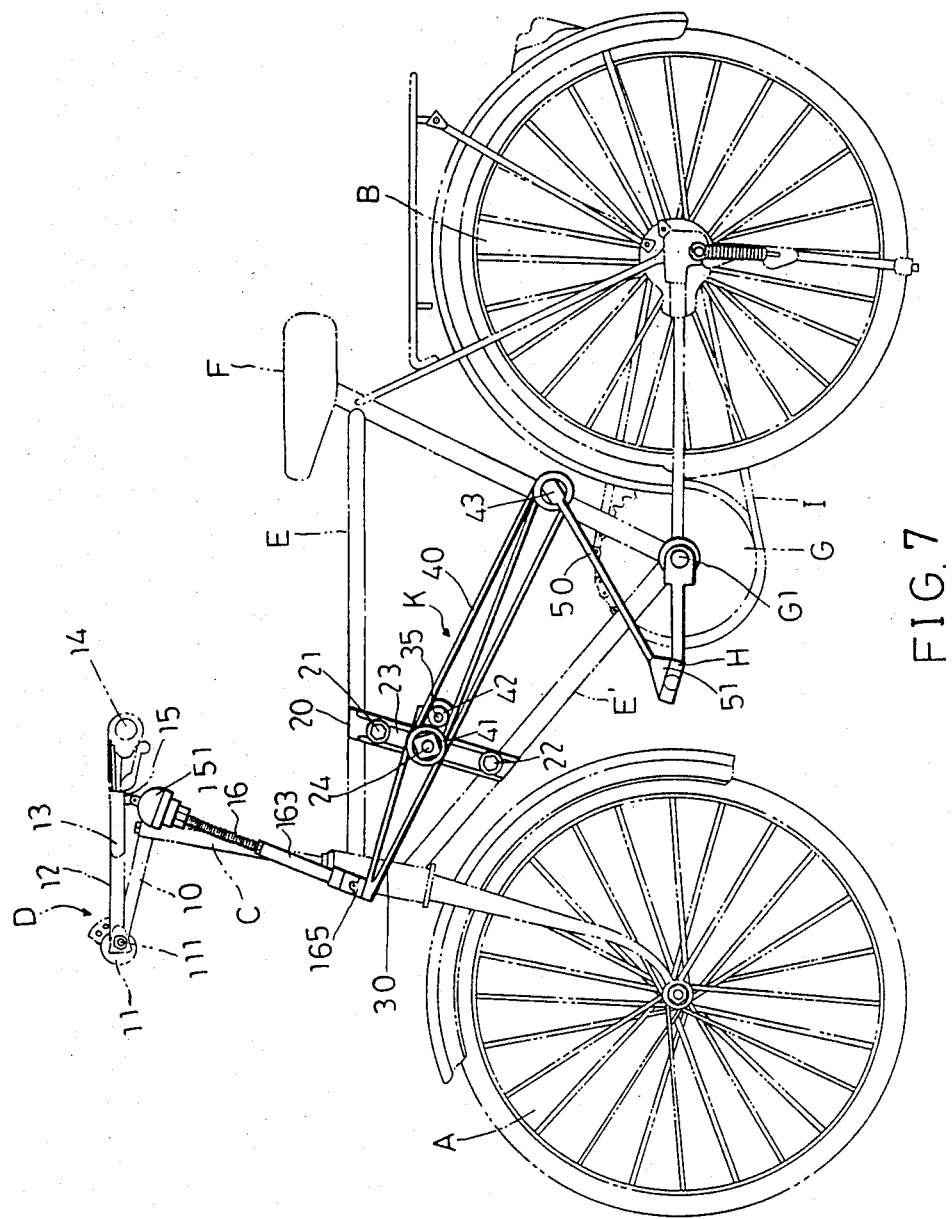
FIG. 7 is a plan illustrative view of the preferred embodiment of FIG. 2.
Figure 8:
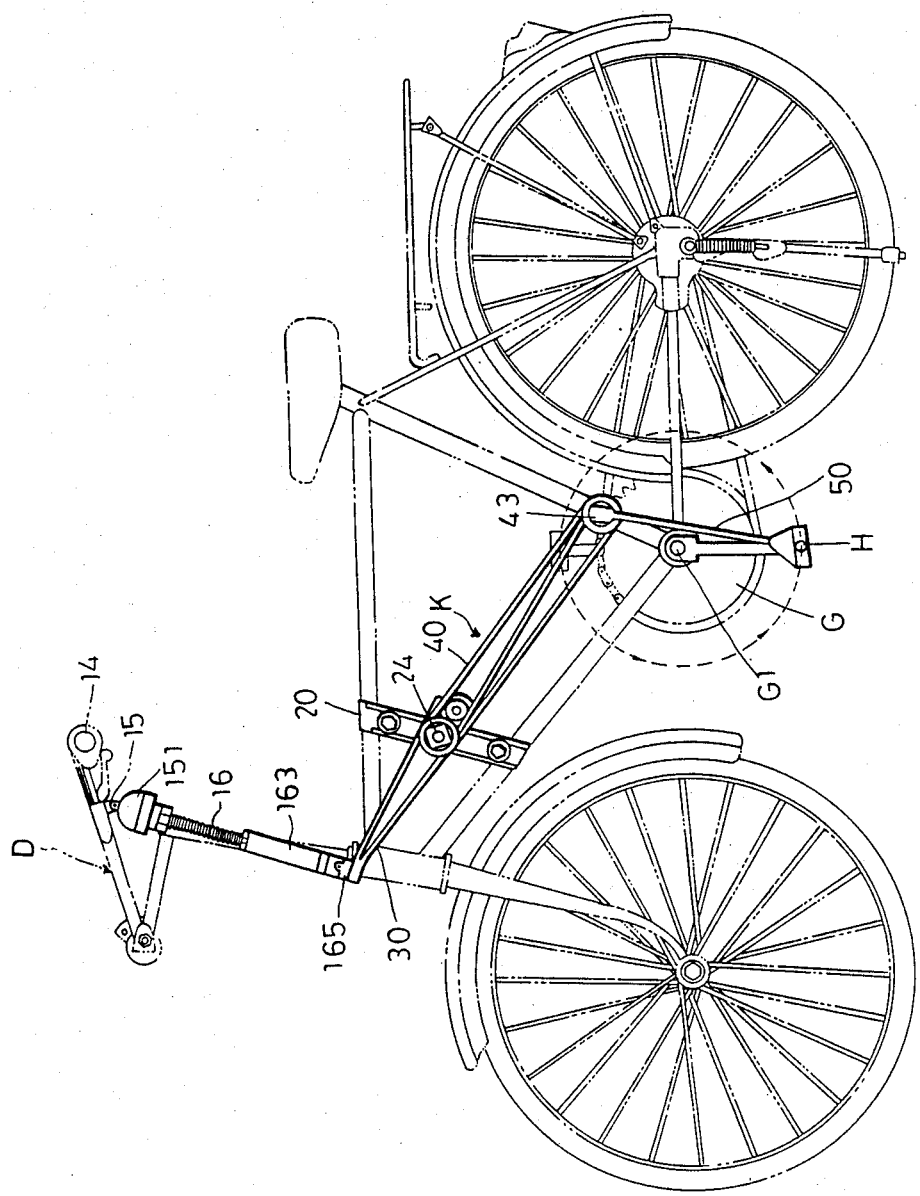
FIG. 8 is an operational illustration of the preferred embodiment, indicating the working condition of the handle device and the lever device when the left pedal of the bicycle is moved to a downward position.
Figure 9:
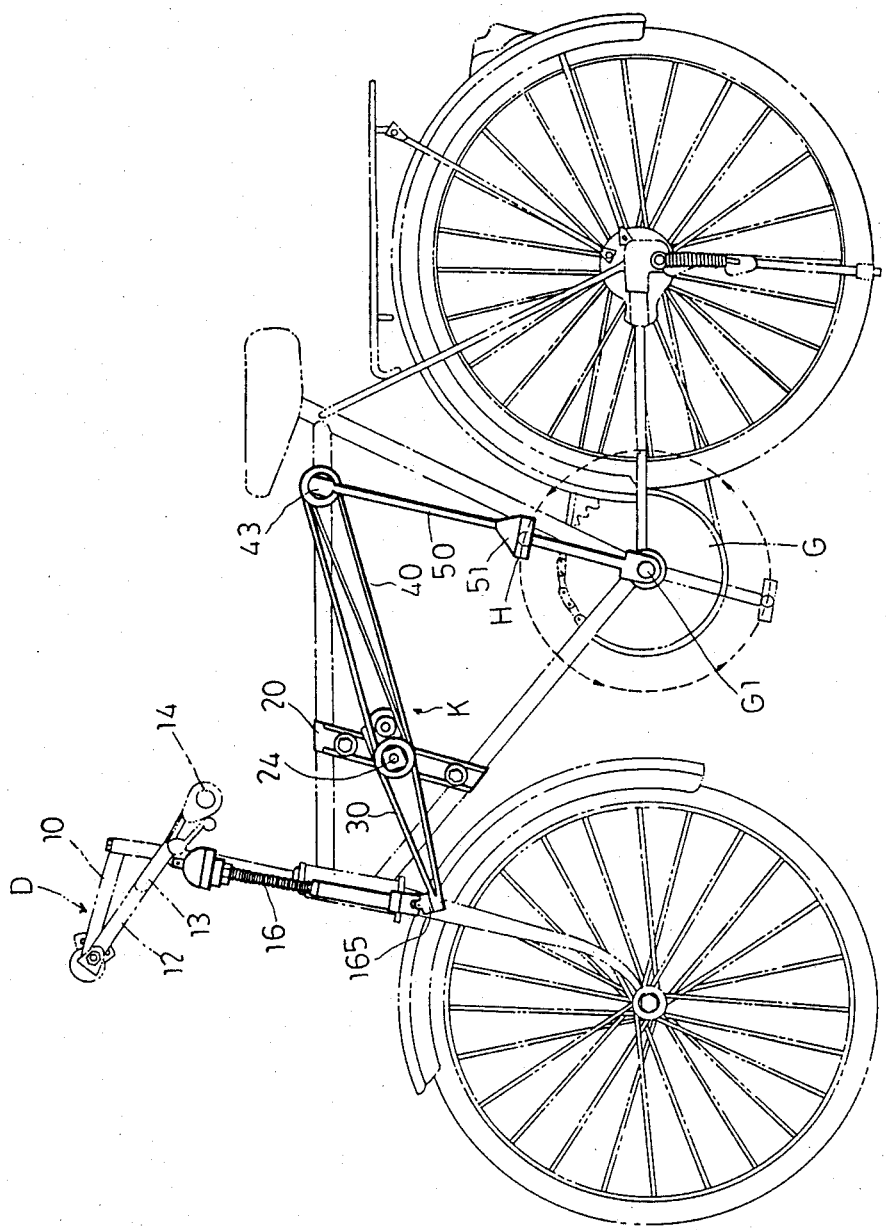
FIG. 9 is an operational illustration of the preferred embodiment, indicating the working condition of the handle device and the lever device when the left pedal of the bicycle is moved to an upward position.

The complete assembly of the preferred embodiment is as shown in FIG. 7 wherein the supporting axle 24 installed at the fixed rod 20 serves as a fulcrum for the lever mechanism K, which is operated on the basis of leverage principle along with the movement of the pedal members H as follows:

When the left pedal is pressed down, as shown in Fig. 8, the rear link 50 will pull the rear end of the rear lever 40 to move downward. With the positioning support provided by the supporting axle 24, the momemtum of the rear lever 40 will be relayed to the front lever 30, of which the front end 165 is urged (under the effect of reaction force) to move upward therefrom, pushing the front link 16 upward. Consequently, the hand grip 14 of the handle device D is lifted up by the front link 16 through the first universal joint 15, and the rider's upper body is also raised up. The rider naturally pulls the handle device D to correspond with his downward pedalling action on the left pedal member H until the left pedal member H reaches at the lowest point, as the hand grip 14 arrives at the highest point, as shown in FIG. 8. In this condition, because of inertia effect from the movement, the rider's right foot will press down the right pedal, and with the rider's upper body movement, the hand grip 14 is pushed downward, pressing down the front link 16 therefrom. As a result, the front end 165 of the front lever 30 will be pushed down, and the rear end of the front lever 30 is urged to lift up the rear end of the rear lever 40. Matched with the upward movement of the rear link 50 along with the left pedal, the rear end of the rear lever 40 is raised up to the highest point while the hand grip 14 is moved down to the lowest point, as shown in FIG. 9, and the rider's upper body is inclines toward the front so that an operational cycle is accomplished. By repeating the above-described action through the rider's hands and feet as well as the body movement, the bicycle is propelled to move forward quickly, and a full kinematic exercise is also achieved.

According to the structure of this invention, the preferred embodiment can be easily changed into an ordinary bicycle mode for foot propelling operation only. As described hereinbefore and illustrated in FIG. 3, the cotter 123 must be pulled out from the opening 1140 and disengaged with the anchoring member 114 before the handle device D can be moved up and down. As shown in FIG. 5A, the cotter 35 is under control of the eccentric wheel 36. Therefore, by lifting up the hand grip 361 of the eccentric wheel 36, the distal end of the cotter 35 will be away from the opening 421, leaving the front lever 30 and the rear lever 40 being movably coupled only at the supporting axle 24 so that the two levers 30 and 40 are separated in respective movement from each other without mutual interference. On the other hand, as shown in FIG. 10, in order to secure the handle device D in position, the cotter 123 installed in the handle device D must be selectively inserted into one of the orifices 1140, as shown in FIG. 10(A) so as to keep the handle device D at a proper height (after the handle device D is secured in position, the rear lever 40 only will be moved.) In this condition, the rotation of the pedal members H is separated from the handle device D, and the bicycle component is operated in the same way as an ordinary bicycle does.

While a preferred embodiment has been illustrated and described, it will be apparent that many changes and modifications may be made in the general constructrion and arrangement of the invention without departing from the spirit and scope thereof, and it is therefore desired that the invention be not limited to the exact disclosure, but only to the extent of the appended claims.

What is claimed is:

1. A dual system bicycle having a front wheel and a rear wheel arranged one behind another, a frame structure with a front fork member and a saddle connected between the front wheel and the rear wheel, and a pair of pedal members together with a chain wheel mechanism rotatably installed at a lower portion of the frame structure, comprising:
   a handle means with a front link mechanism operatively installed on top of the front fork member for being manually operated up and down thereat; and
   a lever means with a rear link mechanism movably connected between the front link mechanism and the pedal members for being cooperatively operated with said handle means; whereby, dual propelling operations through a rider's hands and feet can be effectively performed for promoting the rider's bodily fitness and increasing the moving speed of the bicycle;
   wherein the lever means comprises a fixed rod member having a central slot formed therein vertically installed between a crossbar and a front down tube of the frame structure; a supporting axle mechanism horizontally fixed within the central slot of said fixed rod member; a pair of bearings matched with a pair of bearing blocks installed in the supporting axle mechanism for providing pivoting operations; a front lever having a front end connected to a universal joint at a lower end of a front link member and having a rear end movably coupled with one of said bearings on the supporting axle member; and a rear lever having a front end movably coupled with another one of said bearings on the supporting axle member and having another end pivotally connected to the pedal member through a rear link mechanism so that, when the pedal member is rotated, leverage is produced by said front and rear levers so as to facilitate the upward and downward movement of the handle bar member in performing dual propelling operations.

2. A dual system bicycle according to claim 1 wherein said handle means comprises:
   a supporting arm having one end horizontally fixed at a top end of the front fork member;
   a transverse axle member horizontally connected to another end of said supporting arm from said end fixed to said top end of said fork member as a pivot;
   a curved handlebar member with a hand grip at each end and having a U-shaped piece perpendicularly extending from a center curved portion thereof horizontally connected to both ends of said transverse axle member for effecting up and down movement;
   in which front link member has said universal joint provided at the bottom end thereof and including a second universal joint provided at an upper end of the front link member, the front link member being connected to a rear base point of said U-shaped piece for supporting the upward and downward movement of said handlebar member; and
   an anchoring means with a movable cotter mechanism fixed at one side of said transverse axle member and said U-shaped piece for locking said handlebar member in position; so that hand propelling operation can be performed therewith.

3. A dual system bicycle according to claim 1 wherein said supporting axle mechanism further comprises:
   a pair of bearing blocks superposedly installed in the central slot of said fixed rod member for being respectively connected to said front lever and rear lever;
   a supporting axle disposed in said bearing blocks and fixed at said fixed rod member;
   a pair of cotter blocks each having a central opening superposedly disposed at a rear end of said bearing blocks with central openings of said cotter blocks aligned thereat;
   a hollow sleeve member screw-connected to a top of said cotter blocks in superposition;
   a cotter matched with a spring movably disposed in said hollow sleeve with a top end of the cotter extending out of said hollow sleeve for being movably engaged in said cotter blocks so as to link said rear lever with said front lever in leverage operation; and
   an eccentric wheel having a hand grip formed at one side connected to the top end of said cotter; so that, by operating the hand grip of the eccentric wheel, said cotter can be pulled out of said cotter blocks so as to disengage said rear lever from link-up action with said front lever, so that the bicycle is operated by foot propulsion only.

4. A dual system bicycle having a front wheel and a rear wheel arranged one behind another, a frame structure with a front fork member and a saddle connected between the front wheel and the rear wheel, and a pair of pedal members together with a chain wheel mechanism rotatably installed at a lower portion of the frame structure, comprising:

a handle means with a front link mechanism operatively installed on top of the front fork member for being manually operated up and down thereat;

wherein the handle means comprises a supporting arm having one end horizontally affixed at a top end of the front fork member, a transverse axle member horizontally connected to another end of said supporting arm from said end fixed to said top end of said fork member as a pivot, a curved handlebar member with a hand grip at each end and having a U-shaped piece perpendicularly extending from a center curved portion thereof horizontally connected to both ends of said transverse axle member for effecting up and down movement, a front link member with a universal joint provided at each end connected to a rear base point of said U-shaped piece for supporting the upward and downward movement of said handlebar member, and an anchoring means with a movable cotter mechanism fixed at one side of said transverse axle member and said U-shaped piece for locking said handlebar member in position so that hand propelling operation can be performed therewith; and a lever means with a rear link mechanism movably connected between the front link mechanism and the pedal members for being cooperatively operated with said handle means, whereby dual propelling operations through a rider's hands and feet can be effectively performed for promoting the rider's bodily fitness and increasing the moving speed of the bicycle;

in which said anchoring means comprise an anchoring member having a plurality of orifices formed on one side and vertically fixed at one side of said transverse axle member, a cotter tube with an opening in each side horizontally installed at one end of said U-shaped piece in conjunction with said anchoring member and said orifices, and a cotter member matched with a spring movably installed in said cotter tube with one end extending out of an opening of said cotter tube for being engaged in an associated orifice of said anchoring member so as to lock said handle means in position for changing the propelling mode of the bicycle.

* * * * *

UNITED STATES PATENT AND TRADEMARK OFFICE
CERTIFICATE OF CORRECTION

PATENT NO.  : 4,726,600
DATED       : February 23, 1988
INVENTOR(S) : YING-HAO WU It is certified that error appears in the above-identified patent and that said Letters Patent is hereby corrected as shown below:

IN THE SPECIFICATION

| | |
|---|---|
| Column 1, line 11 | Change "recreations" to -- recreation -- |
| Column 1, line 63 | Change "of" (second occurrence) to -- for -- |
| Column 1, line 65 | Change "hand grips" to -- handgrips -- |
| Column 2, line 65 | Change "hand grips" to -- handgrips -- |

UNITED STATES PATENT AND TRADEMARK OFFICE
CERTIFICATE OF CORRECTION

PATENT NO. : 4,726,600
DATED : February 23, 1988
INVENTOR(S) : YING-HAO WU

Page 2 of 3

It is certified that error appears in the above-identified patent and that said Letters Patent is hereby corrected as shown below:

| | | |
|---|---|---|
| Column 2, line 65 | Change "haveing" to -- having -- |
| Column 2, line 68 | After "device" insert -- D -- |
| Column 3, line 3 | Change "oppossing" to -- opposing -- |
| Column 3, line 13 | Change "hand grips" to -- handgrips -- |
| Column 3, line 23 | Change "member 14" to -- member 114 -- |
| Column 3, line 23 | Change "hand grips" to -- handgrips -- |
| Column 3, line 28 | Change "hand grip" to -- handgrip -- |
| Column 3, line 34 | Change "univeral" to -- universal -- |
| Column 4, line 10 | Before "top" change "at" to -- a -- |
| Column 4, lines 17, 19 | Change "hand grip" to -- handgrip -- (both occurrences) |
| Column 4, line 23 | Change "FIG." to -- FIGS. -- |
| Column 4, line 35 | After "follows:" delete ":" and insert -- . -- |

UNITED STATES PATENT AND TRADEMARK OFFICE
CERTIFICATE OF CORRECTION

PATENT NO. : 4,726,600

DATED : February 23, 1988

INVENTOR(S) : YING-HAO WU

It is certified that error appears in the above-identified patent and that said Letters Patent is hereby corrected as shown below:

| | |
|---|---|
| Column 4, lines 43,50 | Change "hand grip" to -- handgrip -- (both occurrences) |
| Column 4, lines 54,61 | Change "hand grip" to -- handgrip -- |
| Column 4, line 63 | Change "inclines" to -- inclined -- |
| Column 5, line 9 | Change "hand grip" to -- handgrip -- |
| Column 5, line 22 | Change "moved.)" to -- moved). -- |
| Column 5, lines 28,29 | Change "constructrion" to -- construction -- |

IN THE CLAIMS

| | |
|---|---|
| Column 6, line 14 | Change "hand grip" to -- handgrip -- |
| Column 6, line 56 | Change "hand grip" to -- handgrip -- |

Signed and Sealed this

Twenty-seventh Day of September, 1988

*Attest:*

DONALD J. QUIGG

*Attesting Officer*  *Commissioner of Patents and Trademarks*